(12) United States Patent
Davis et al.

(10) Patent No.: US 6,431,880 B1
(45) Date of Patent: Aug. 13, 2002

(54) MODULAR TERMINAL FUSE BLOCK

(75) Inventors: Ruel Emmett Davis, St. Charles; Matthew Alan Joiner, Fenton, both of MO (US)

(73) Assignee: Cooper Technologies, Houston, TX (US)

( * ) Notice: Subject to any disclaimer, the term of this patent is extended or adjusted under 35 U.S.C. 154(b) by 0 days.

(21) Appl. No.: 09/849,206

(22) Filed: May 4, 2001

Related U.S. Application Data

(63) Continuation-in-part of application No. 09/102,100, filed on Jun. 22, 1998, now Pat. No. 6,227,913.

(51) Int. Cl.⁷ .......................... H01R 12/00; H05K 1/00
(52) U.S. Cl. ..................................... 439/76.2; 439/949
(58) Field of Search ................................ 439/76.2, 949

(56) References Cited

U.S. PATENT DOCUMENTS

| | | | | |
|---|---|---|---|---|
| 4,798,545 A | * | 1/1989 | Roy et al. .................... 439/677 |
| 5,000,699 A | * | 3/1991 | Nadin ......................... 439/189 |
| 5,023,752 A | * | 6/1991 | Detter et al. ................. 361/646 |
| 5,207,587 A | * | 5/1993 | Hamill et al. ................ 361/826 |
| 5,285,011 A | * | 2/1994 | Shimochi ................. 174/138 F |
| 5,530,625 A | * | 6/1996 | VanDerStuyf et al. ....... 174/255 |
| 5,581,130 A | * | 12/1996 | Boucheron ................. 307/10.1 |
| 5,788,519 A | * | 8/1998 | Stern .......................... 439/189 |
| 6,007,351 A | * | 12/1999 | Gabrisko et al. ........... 439/76.2 |
| 6,015,302 A | * | 1/2000 | Butts et al. ................. 439/76.2 |
| 6,126,457 A | * | 10/2000 | Smith et al. ................ 439/76.2 |

* cited by examiner

Primary Examiner—Brian Sircus
Assistant Examiner—Hae Moon Hyeon
(74) Attorney, Agent, or Firm—Armstrong Teasdale LLP

(57) ABSTRACT

A power distribution block assembly includes an insulative body having at least a first modular body section and a second modular body section, and at least one electrically conductive bus member having a longitudinally-extending base and a plurality of terminal blades extending from the base. The base of the bus member has a site for electrical connection to a power source and a longitudinally elongated U-shape channel defined by opposite legs. A plurality of terminal blades extend from the legs of the channel and include a plurality of sites for electrical connection to a plurality of removable circuit elements. A plurality of separate connector elements are contained within the body, and each of the connector elements are configured to engage a terminal blade of the bus with a terminal of a respective one of the removable circuit elements.

20 Claims, 17 Drawing Sheets

MODULAR TERMINAL FUSE BLOCK

CROSS REFERENCE TO RELATED APPLICATIONS

This application is a continuation in part application of U.S. application Ser. No. 09/102,100 filed Jun. 22, 1998 now U.S. Pat. No. 6,227,913.

BACKGROUND OF THE INVENTION

This invention relates to power distribution blocks in general. In particular, the invention relates to a fuse block having a common power bus.

Power distribution blocks are commonly used in the art to collect a plurality of circuit elements, such as fuses, in one central location.

Several fuse blocks are presently available as snap-together modules that form a multifused panel. These snap-together modules are excessively large when a large number of fuses are to be held in the block. The modules also involve costly, labor intensive assembly.

Existing fuse block designs also commonly require the user to individually wire each circuit within the block for power input. When it is desired to power more than one circuit with the same power source, a jumper is installed for this purpose. These multiple wiring procedures, and the installation of a jumper, are costly, labor intensive, and time consuming to the user. In addition, added circuits require the use of larger gauge wiring in order to handle the additional amp load. The use of larger gauge wire is costly, difficult to handle, and requires more panel space to mount the fuse block.

Another problem with existing designs is the inability to protect the fuse block components from contamination, especially from liquids. Although "splash covers" are available for some existing designs, these covers are in the form of additional components that must be bolted in place. This type of splash cover poses certain disadvantages in that it requires additional panel space to be secured, and presents an additional labor cost for installation.

U.S. Pat. No. 4,944,691 to Morach discloses a holder for removable circuit elements. The holder includes a metal bus bar having a plurality of fuse holders formed integrally therewith. Output terminals are provided which extend laterally from the bus bar. A cover member is provided that includes openings in the top for insertion of fuses.

U.S. Pat. No. 4,599,679 to Baader discloses a fuse bus bar assembly that includes a bus bar formed as two separate components that are stacked on top of each other. The bus bar components include oppositely bent tangs that cooperate to receive fuse terminals for electrical connection therewith. A cover member is provided that includes a plurality of openings for receipt of fuses. This construction requires rather precise formation and assembly in order for the tangs to properly receive and mate with the fuse terminals. If one tang is misformed or damaged, it may be necessary to replace the entire bus bar component. In addition, the housing and cover do not serve to effectively isolate the circuit elements or fuses from contaminants.

U.S. Pat. No. 5,438,310 to Ikari discloses a fuse box formed by a plurality of separate components that are mechanically attached to one another. This construction is overly complex, costly to manufacture, and less compact when compared to the present invention.

U.S. Pat. No. 4,842,534 to Mobley et al. discloses a fuse/bus bar assembly having a plurality of (female) terminal members attached thereto. The physical attachment of the terminal members to the bus bar represents an increase in cost and labor over the construction of the present invention.

BRIEF SUMMARY OF THE INVENTION

In an exemplary embodiment of the invention, a power distribution block assembly includes an insulative body having at least a first modular body section and a second modular body section, and at least one electrically conductive bus member having a longitudinally-extending base and a plurality of terminal blades extending from the base. The base of the bus member has a site for electrical connection to a power source and a longitudinally elongated U-shape channel defined by opposite legs. A plurality of terminal blades extend from the legs of the channel and include a plurality of sites for electrical connection to a plurality of removable circuit elements. A plurality of separate connector elements are contained within the body, and each of the connector elements are configured to engage a terminal blade of the bus with a terminal of a respective one of the removable circuit elements.

The modular construction of the insulative body facilitates use of a wide range of bus bars and different numbers of poles in a compact, easily assembled, low cost unit. The insulative body includes at least a first end section, a second end section, and a middle section engaged to the first end section and to the second end section. The modular sections are configured for snap-fit engagement to one another, and each of the sections include a plurality of electrical access openings providing access to respective sites of the terminal blades of the conductive bus member.

The modular body sections include male and female couplings configured for connection to one another to form an appropriately sized body to accommodate a specified bus bar or bus bars for power input. A tongue and groove arrangement securely connects the sections to one another, and, by adding or subtracting middle sections to the modular body, a wide range of power distribution blocks for accommodating different bus bars and having different numbers of poles is facilitated in a low cost, versatile, easy to assemble system.

DETAILED DESCRIPTION OF THE INVENTION

Figure 1:
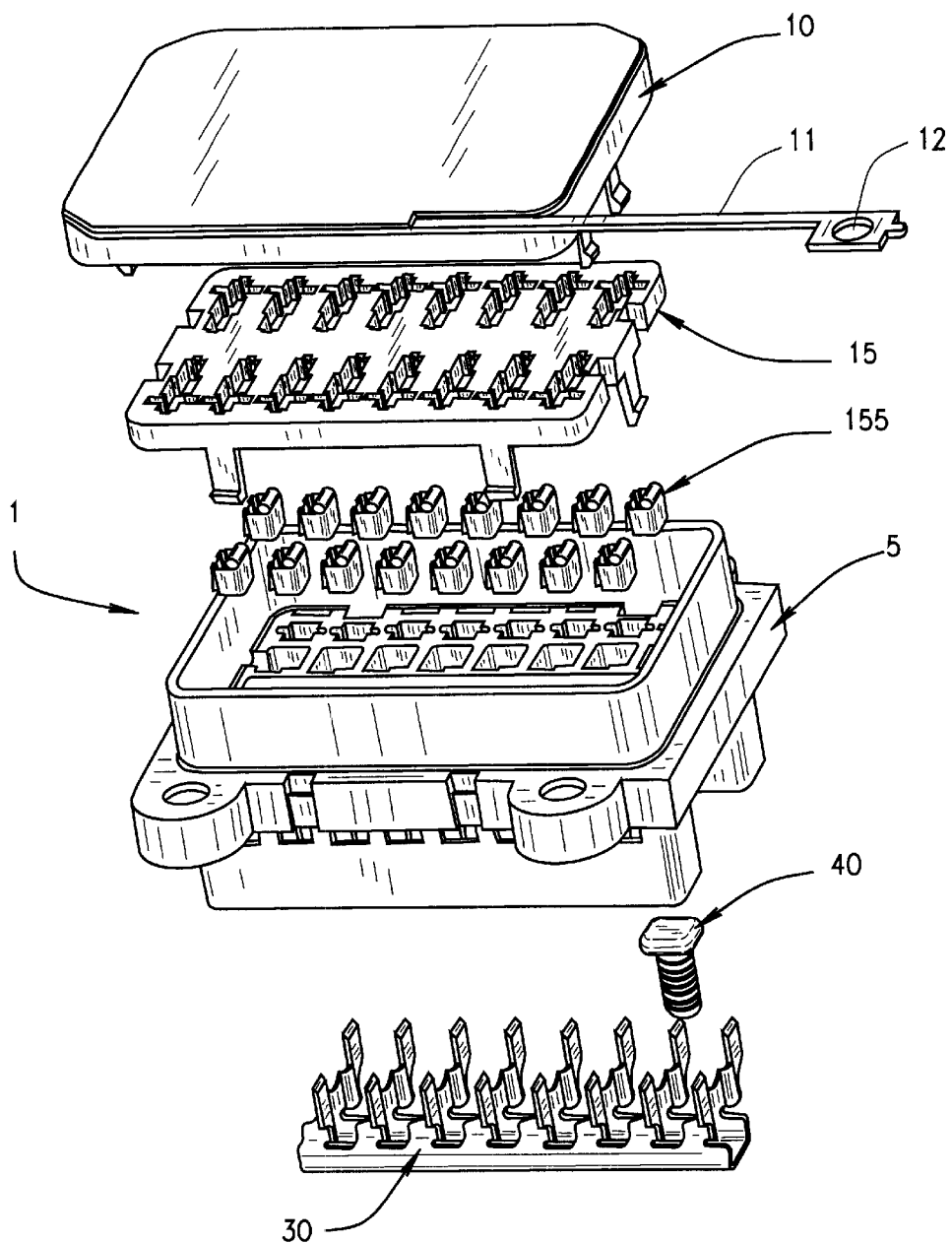
FIG. 1 is an exploded perspective view of a power distribution block constructed according to an embodiment of the present invention.

Certain components of a power distribution block assembly 1 according to the present invention are illustrated generally in FIG. 1. An insulative body 5 receives a tray member 15. A "splash-proof" cover 10 is mounted to the body 5 to enclose the interior thereof.

The insulative body 5, in one embodiment, is preferably constructed as a unitary member. The term "unitary" is intended to mean a one-piece monolithic member. The body 5 can be constructed from any suitable material. One preferred material is a strong, heat-resistant, chemical resistant plastic.

The body 5 may have one or more mounting flanges 125, each having an aperture 127, with a threaded insert disposed therein (FIG. 5) for receiving a suitable fastener (not shown). The body 5 is also provided with an upstanding sidewall 115 and in interior compartment 120.

Figure 2:
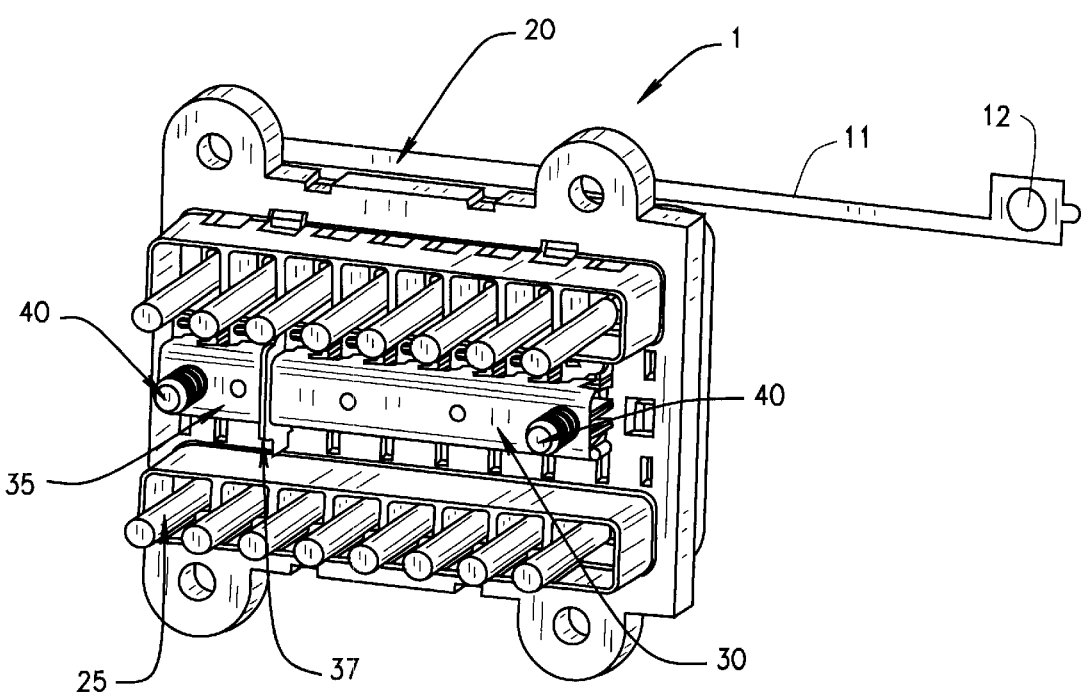
FIG. 2 is a bottom perspective view of power distribution block of one embodiment of the present invention.

As illustrated in FIG. 2, one or more electrically conductive bus members 30, 35 are inserted into the bottom of insulative body 5. The power distribution block assembly 1 may include a plurality of electrically conductive bus members 30, 35, each having a means of connecting to a power source. One such means is a threaded stud 40, although it is possible to use other types of connectors. If there are more than one conductive bus members 30, 35, they are separated from each other by a gap or an electrically-insulative spacer element 37. Through the use of separate conductive bus members 30, 35, it is possible to provide power to the power distribution block assembly 1 from a plurality of different sources.

For example, in vehicular applications it is often advantageous to provide power to certain circuit elements from a power source (e.g., a battery) at all times, and to provide power to other circuit elements only at certain times e.g., when the ignition system of the vehicle is activated. While the embodiment illustrated in FIG. 2 shows a 12-pole bus 30 in combination with a 4-pole bus 35, it should be understood that the number of poles provided on each of the bus members 30, 35, can vary widely depending upon the requirements of the particular system being powered. By way of example, 4, 6, 8, 10, 12, 16, 20 and 24-pole configurations are also possible. Also, more than two bus members may be utilized. Alternatively, a single bus bar member may be utilized.

Figure 3:
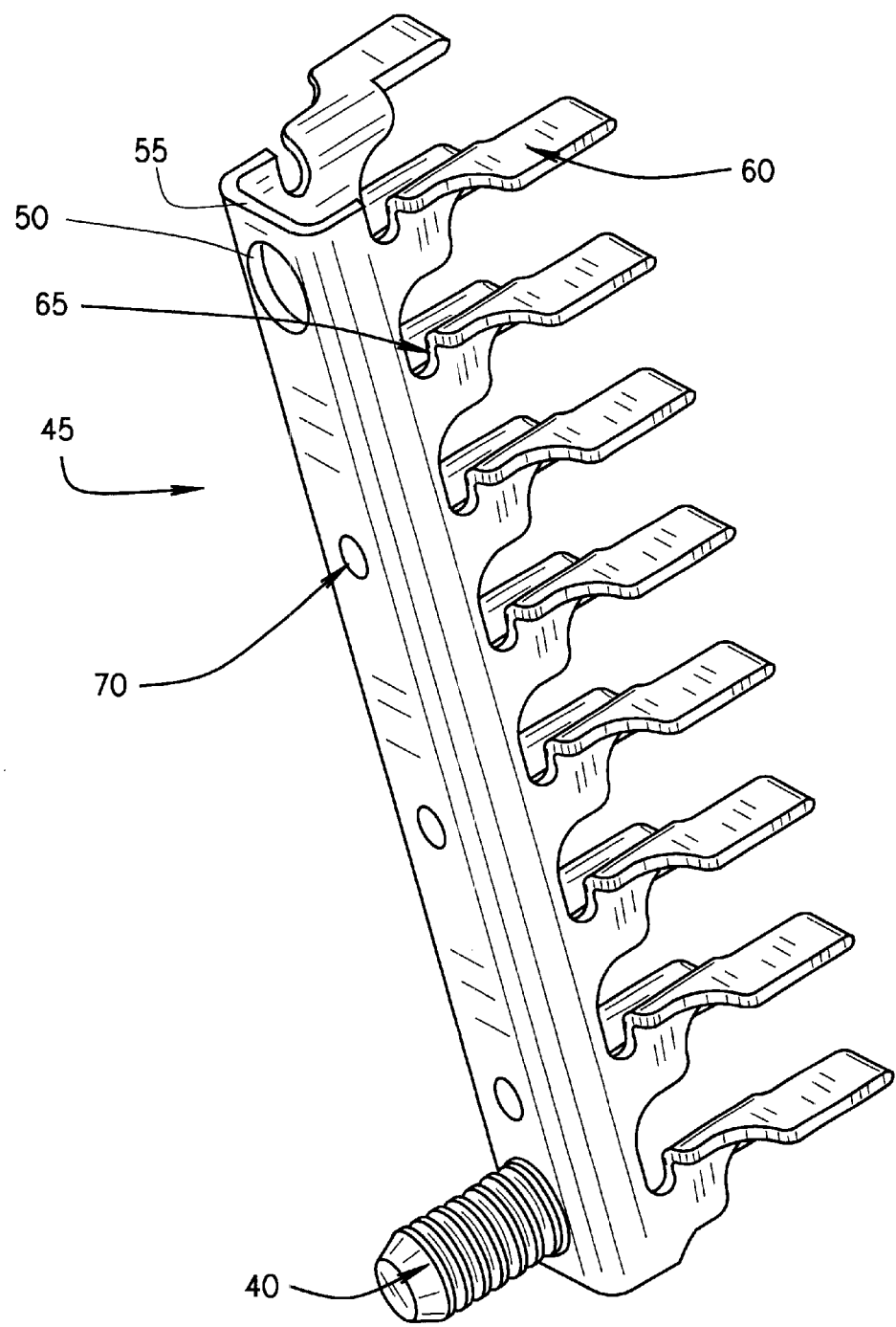
FIG. 3 is a perspective view of a power bus bar constructed according to the principles of the present invention.

Details of a representative bus member 45 constructed according to the present invention are illustrated in FIG. 3. Bus bar members 30, 35 may be constructed in the manner described below with respect to representative bus bar 45. The bus member 45 is made of any suitable electrically conductive material. Preferably, the material is capable of carrying relatively high currents. One such suitable material is C1100 alloy, which is 99.9% pure copper with ½ hard temper. The bus member 45 has a longitudinally extended U-shaped base 55. One or more apertures 50 are provided in the base 55 to receive a suitable electrical connector, such as threaded stud 40. An aperture 50 may be located at either end of base 55. A stud 40 can be located at either end, thereby providing the most convenient location for connection to a power source and facilitating connection. The base 55 may optionally include one or more holes 70 through which a suitable fastener (not shown) may pass to affix the bus member 45 to the body 5. A plurality of power output wires 25 are attached to the block assembly 1 in a manner to be described more fully below.

As shown in FIG. 3, the conductive bus member 45 also includes a plurality of terminal blades 60 that extend from the legs of the U-shaped base 55. A plurality of attachment formations, preferably in the form of undercuts 65 are provided in the legs of the U-shaped base 55 at the location of each terminal blade 60. The construction of the bus member 45 provides several advantages. For example, the terminal blades 60 permit attachment of a plurality of circuit elements, as will be described more fully below. These circuit elements may be powered by a single electrical connection to the base 55, instead of resorting to jumpers or individual circuit wiring schemes. The bus member 45 can carry high currents with a close spacing of circuit elements without overheating, thereby providing reliability and compactness.

Figure 4:
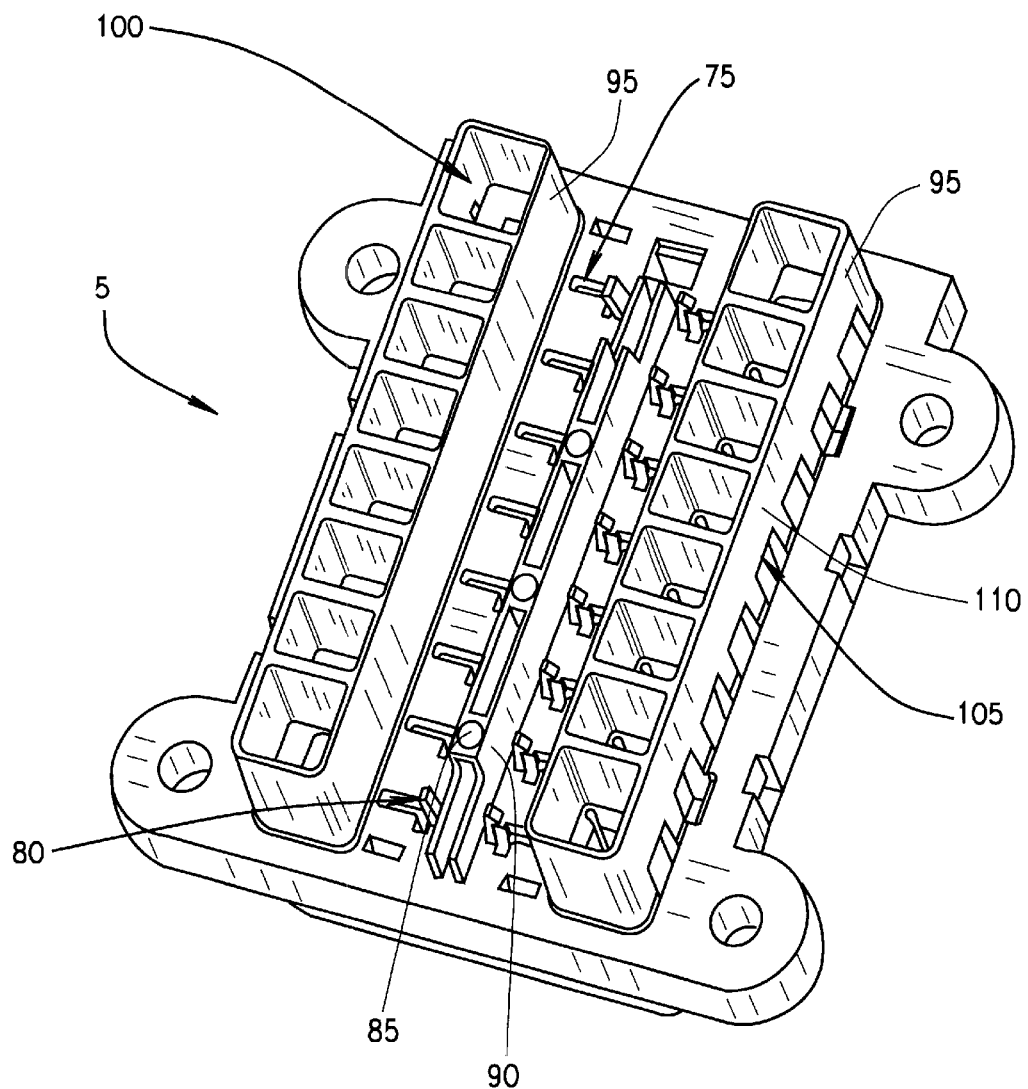
FIG. 4 is a bottom perspective view of a power distribution block body constructed according to the principles of the present invention.

The manner in which the bus member 45 can be attached to the insulative body 5 is further explained by reference to FIG. 4.

Slots 75 are provided in the bottom of body 5 to receive the terminal blades 60. These slots 75 can be numbered to facilitate identification of the individual circuit elements attached to each blade 60.

An attachment projection 80 is formed integrally with the body 5 and is located at each slot 75 to provide a snap-fit engagement with the undercuts 65 of the bus member 45. A bus attachment beam 90 may also be provided along the bottom of the body 5. Optionally, holes 85 can be provided in the beam 90. Holes 85 correspond with optional fastener holes 70 in base 55 of the bus member 45 and accept suitable fasteners (not shown) for providing added means of securing bus member 45 to the body 5.

The body 5 further includes a pair of integrally formed parallel legs 95. Legs 95 define a plurality of open chambers 100 which permit the passage of connector elements, as will be more fully explained below.

Figure 5:
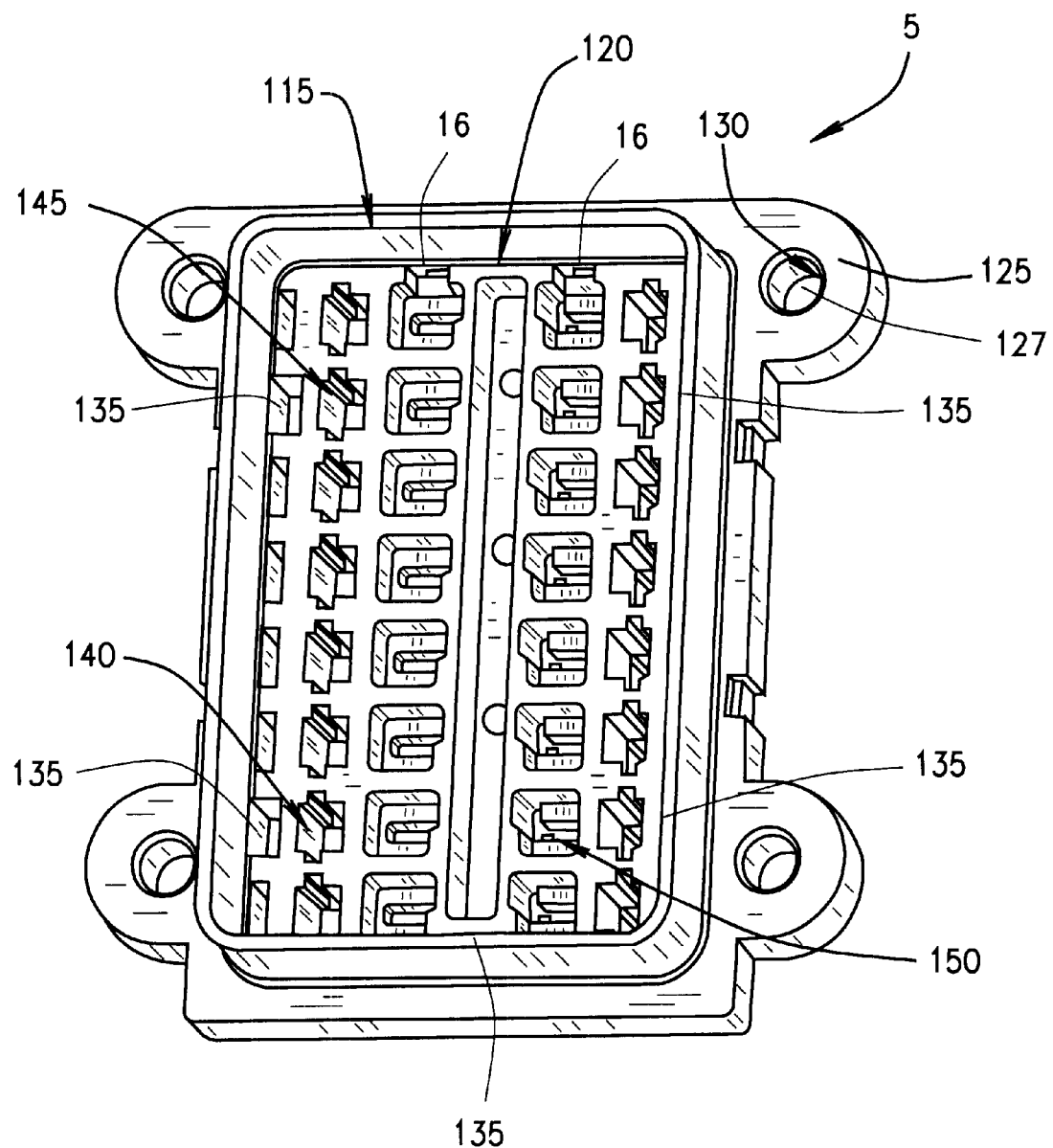
FIG. 5 is a top perspective view of the power distribution block body of FIG. 4.
Figure 6:
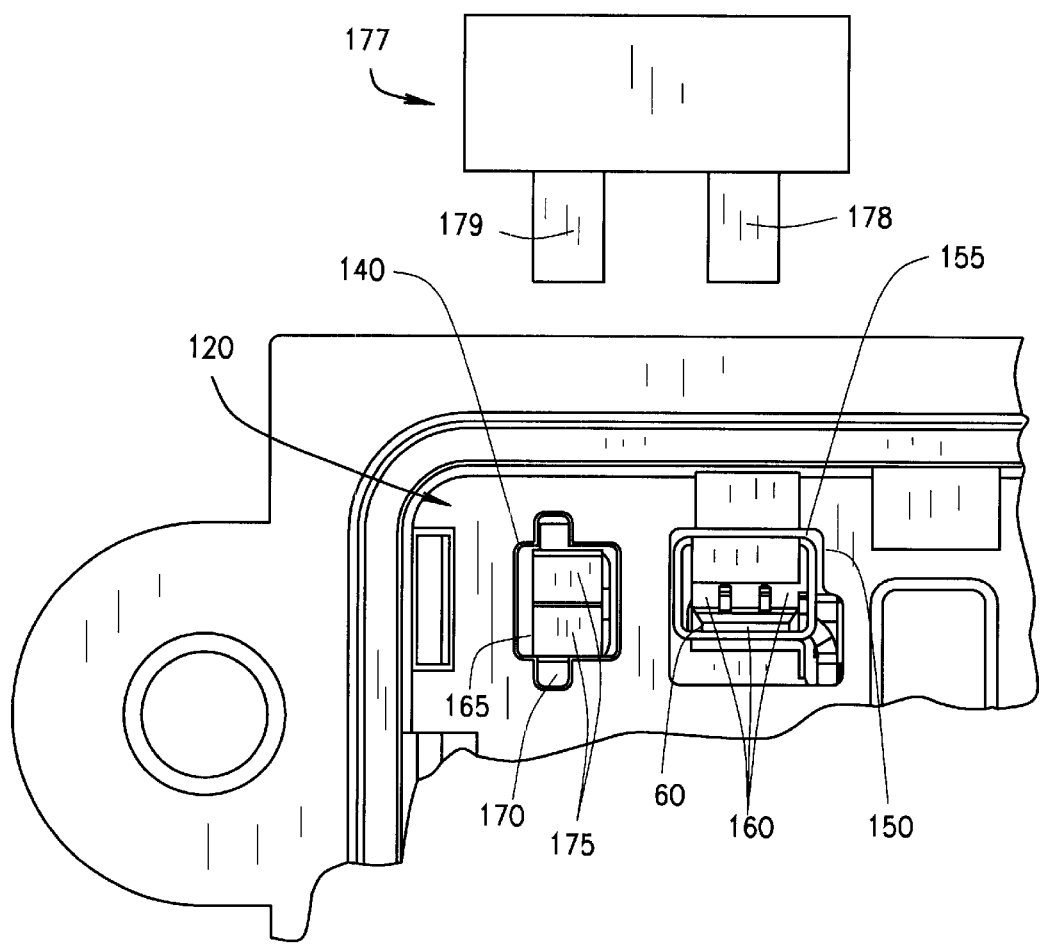
FIG. 6 is a partial top view of the power distribution block of FIG. 5 having a plurality of connector elements housed therein, and an associated removable circuit element.
Figure 7:
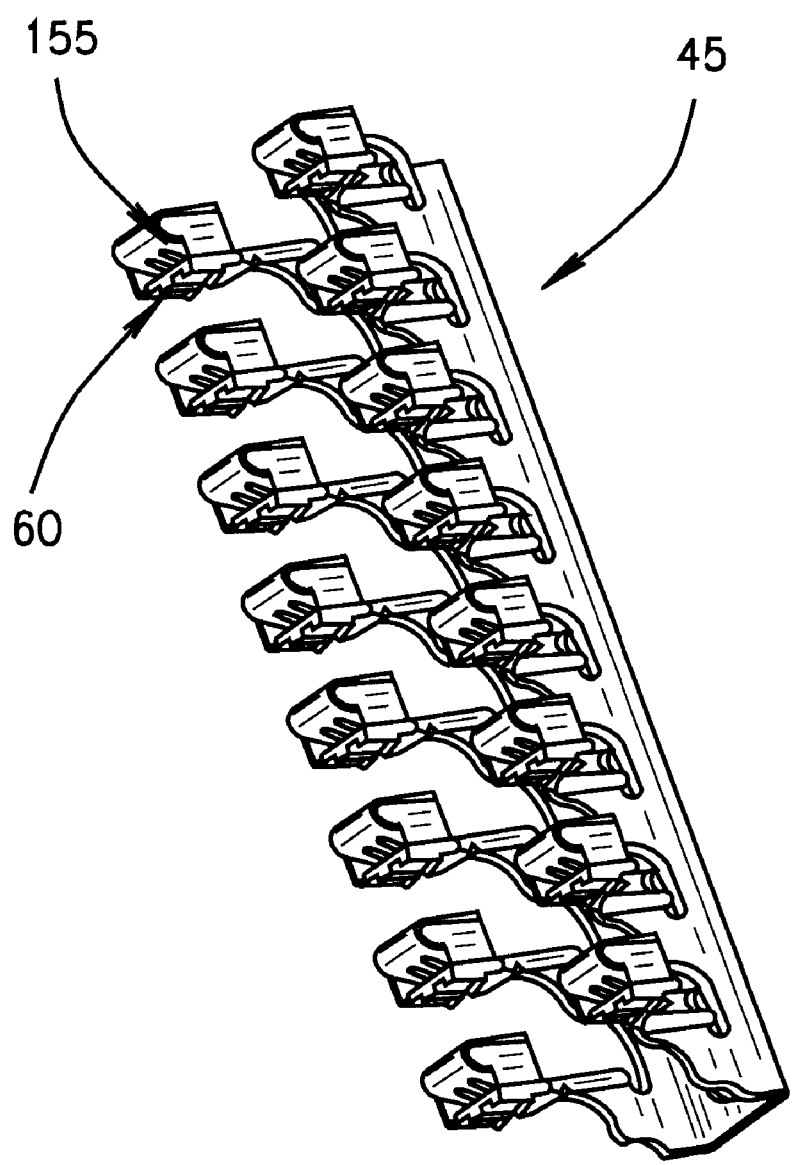
FIG. 7 is a perspective view of the power bus bar of FIG. 3 in combination with an electrical connector element.

The other side of body 5 is described by reference to FIG. 5. Located within the interior compartment 120 are a plurality of passageways 140 for the receipt of a load-side terminal of a removable circuit element. A plurality of pockets 150 are also provided within the interior compartment 120. Pockets 150 house a plurality of connector elements 155 (FIGS. 6 and 7). Terminal blade slots extend from the bottom of body 5 and are in communication with the bottom of pockets 150.

As illustrated in FIGS. 6 and 7, a separate connector element 155 is located in each pocket 150. Terminal blades 60 extend up into pockets 150 through slot openings 75. Each connector element 155 fits over a terminal blade 60 in a manner best illustrated in FIG. 7. Connector elements 155 are formed of any suitable material, such as stainless steel. An input side terminal 178 of a removable circuit element 177 can then be received between the spring fingers 160 of the connector element 155 and the terminal blade 60. In this manner a direct electrical connection is made between a terminal 178 and terminal blade 60. Connector element 155 is not intended to be a current-carrying element.

A load-side female connector 165 is received within each of the passageways 140. See FIG. 8. A load-side terminal 179 can be received between two bent over contacts 175 of the female connector 165. A pair of locking members 170 project laterally from the female connector 175 and rest upon ledges 145 formed within pockets 140. This construction prevents the female connector 16 from passing through the bottom of open chambers 100. A plurality of retention tabs 167, 169 are provided at the lower end connector element 165 which receive and retain the output wires W in a manner common in the art.

Figure 8:
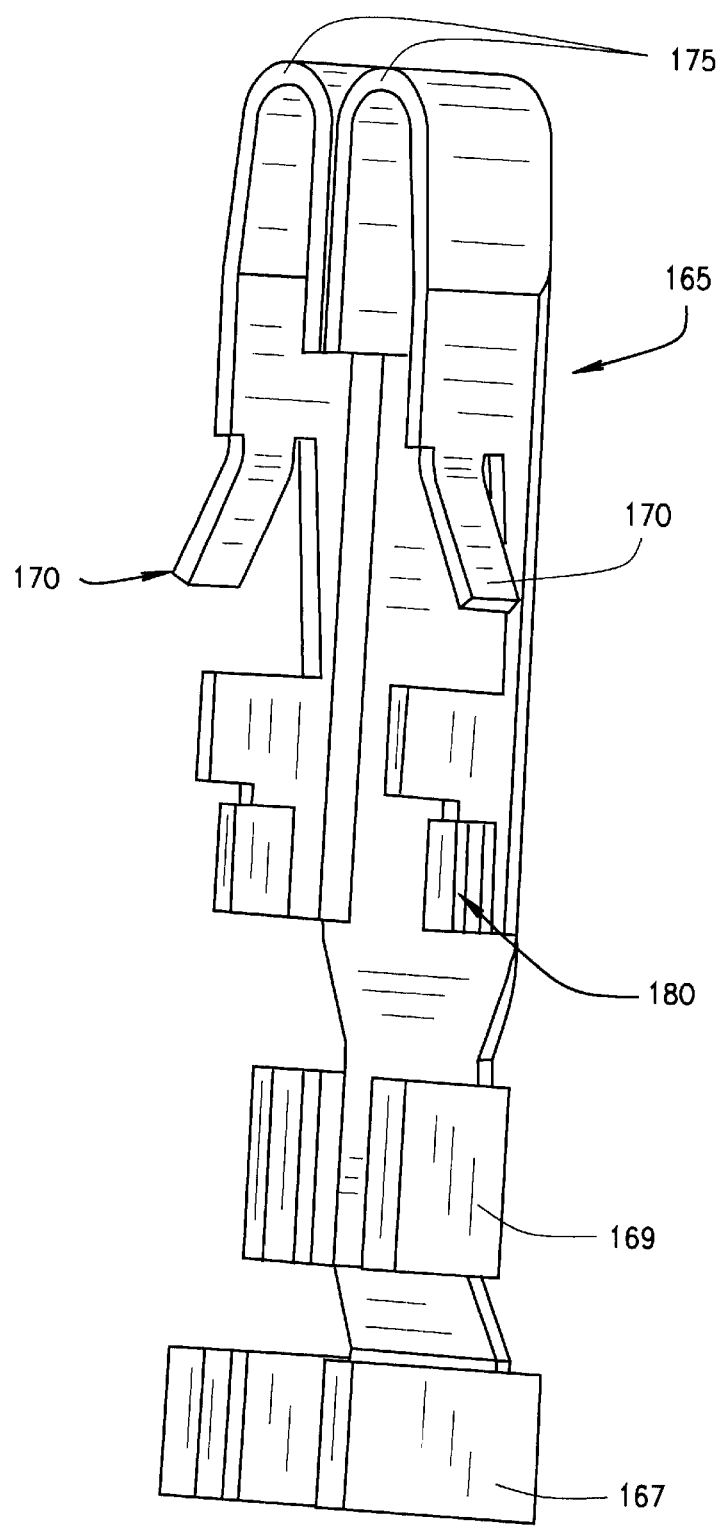
FIG. 8 is a perspective view of a female connector element utilized in connection with the present invention.

The female terminal connector 165 illustrated in FIG. 8 is similar to a "Packard" type connecting terminal. However, the present invention is not dependent upon the specific type of load-side connector utilized. Numerous connector designs are possible for connection to the load-side terminal 179.

In one embodiment, removable circuit element 177 can comprise a fuse element. Numerous types of fuse elements can be utilized. By way of example, an ATC™ type fuse (available from Cooper Industries-Bussmann Division) may be effectively utilized with the power distribution block of the present invention.

Figure 6A:
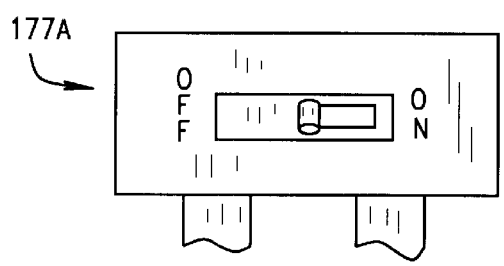
FIG. 6A is a partial perspective view of an alternative embodiment of a removable circuit element.

In an alternative embodiment, the removable circuit elements(s) may comprise a circuit breaker element 177A which is schematically illustrated in FIG. 6A.

Figure 9:
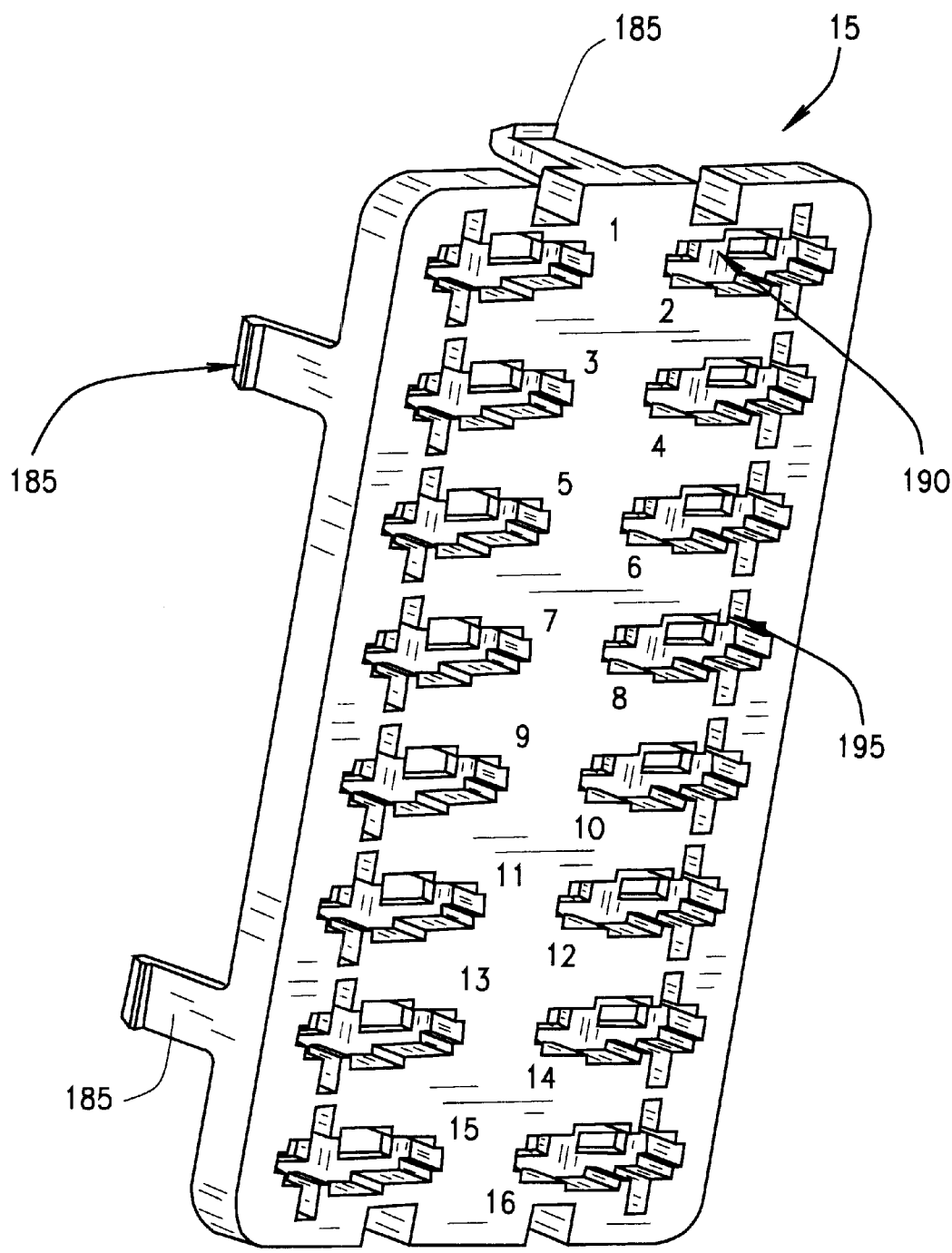
FIG. 9 is a perspective view of the tray element illustrated in FIG. 1.

As best illustrated in FIGS. 1 and 9, a tray 15 may also be located within the interior compartment 120 of body 5. Tray 15 is preferably formed of an insulative material similar to that of body 5. Tray 15 is provided with a plurality of retaining projections 185 that are received with a snap-fit in a plurality of corresponding retaining apertures 135 in the body 5 (FIG. 5). Proper insertion of the tray 15 within the internal compartment 120 can be ensured by providing at least one retaining projection 185 which mates with a corresponding retaining aperture 135 only when tray 15 is properly oriented relative to the body 5.

The tray 15 is provided with a plurality of openings 190 which receive the removable circuit elements 177. The openings 190 may be numbered so as to correspond with the numbering of terminal blades slots 75, through facilitating identification of the circuits and circuit elements 177.

Openings 190 also include enlarged area 195 which permits the insertion of a removal tool (not shown) to withdraw load-side connector 165.

By this construction, tray 15 guides and organizes the removable circuit elements 177. Tray 15 also serves to enclose and retain box connectors 155 and female connectors 165.

Figure 10:
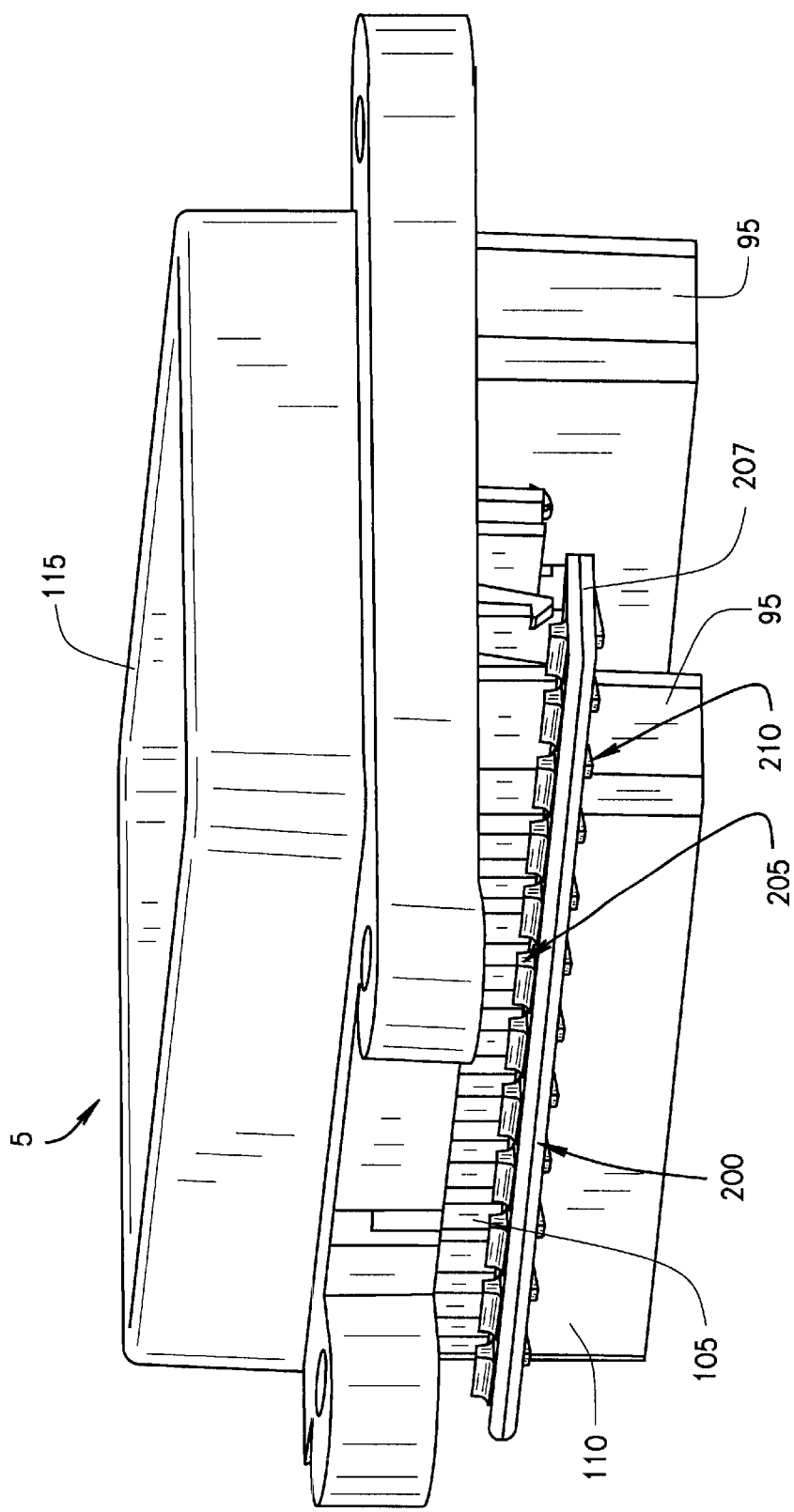
FIG. 10 is a perspective view of a power distribution block body as shown in FIG. 1, in combination with a female fuse clip locking member constructed according to the present invention.

In an alternative embodiment, the power distribution block assembly 1 may include an additional means for securing the female connector elements 165. One possible supplemental locking member 200 is illustrated in FIG. 10. Locking member 200 can be formed of any suitable material, such as insulative material similar to that of body 5. Locking member 200 includes a plurality of bosses 205 that are adapted to fit within corresponding slot head recessed openings 105 formed in side surfaces 110 of legs 95. Locking projections 207 include snap-fit tongues 210 that retain the locking member 200 once it is inserted into the openings 105. Locking projections 207 are configured to engage an engagement portion or shelf 180 formed on the female connector 165 (FIG. 8). Therefore, locking member 200 acts to further retain female connectors 165 within the open chambers 100.

Another aspect of the present invention involves providing a cover member 10 which effectively seals off the interior compartment 120 of the body 5, thereby preventing contamination of the circuit elements 177 and electrical connections housed therein. Cover member 10 can be formed of any suitable material, such as an insulative material similar to that of body 5.

Figure 11:
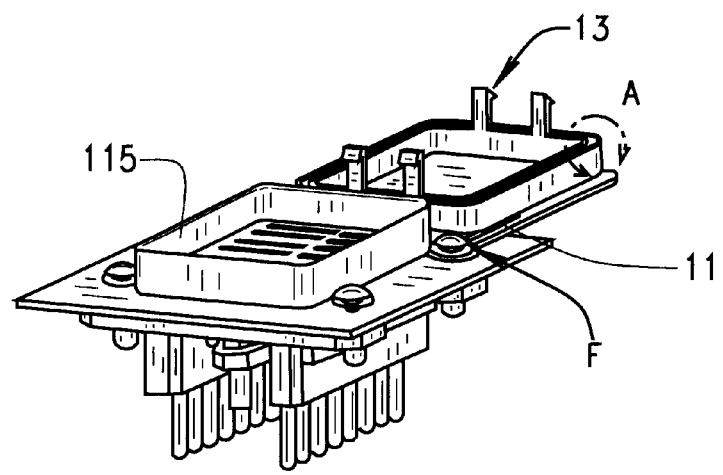
FIG. 11 is a perspective view of a power distribution block with an attached tether cover constructed according to the present invention.
Figure 11A:
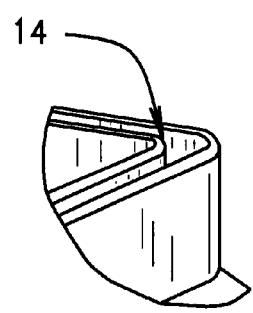
FIG. 11A is a detailed perspective view of a portion of the cover member FIG. 11.

As best illustrated in FIGS. 1 and 11, cover 10 may include a plurality of retaining projections 13 that are received with a snap-fit engagement in corresponding apertures 16 provided within body 5. Cover 10 may also have an integral tether 11. Tether 11 has a aperture 12 located at an end thereof for receiving a suitable fastener F. By this construction, the cover is prevented from being lost or dropped when removed. Cover member 10 may further be provided with side walls in the form of a U-shaped channel 14. The U-shaped channel 14 is constructed to receive the upstanding sidewall 115 of the body 5 therein. The arrangement forms an effective seal between the cover 10 and sidewall 115 that effectively excludes contaminants from the interior compartment 120, especially splashed liquids. Although not specifically illustrated, cover 10 may also include means to further facilitate grasping and removal, such as tabs, projections, recesses, etc.

Figure 12:
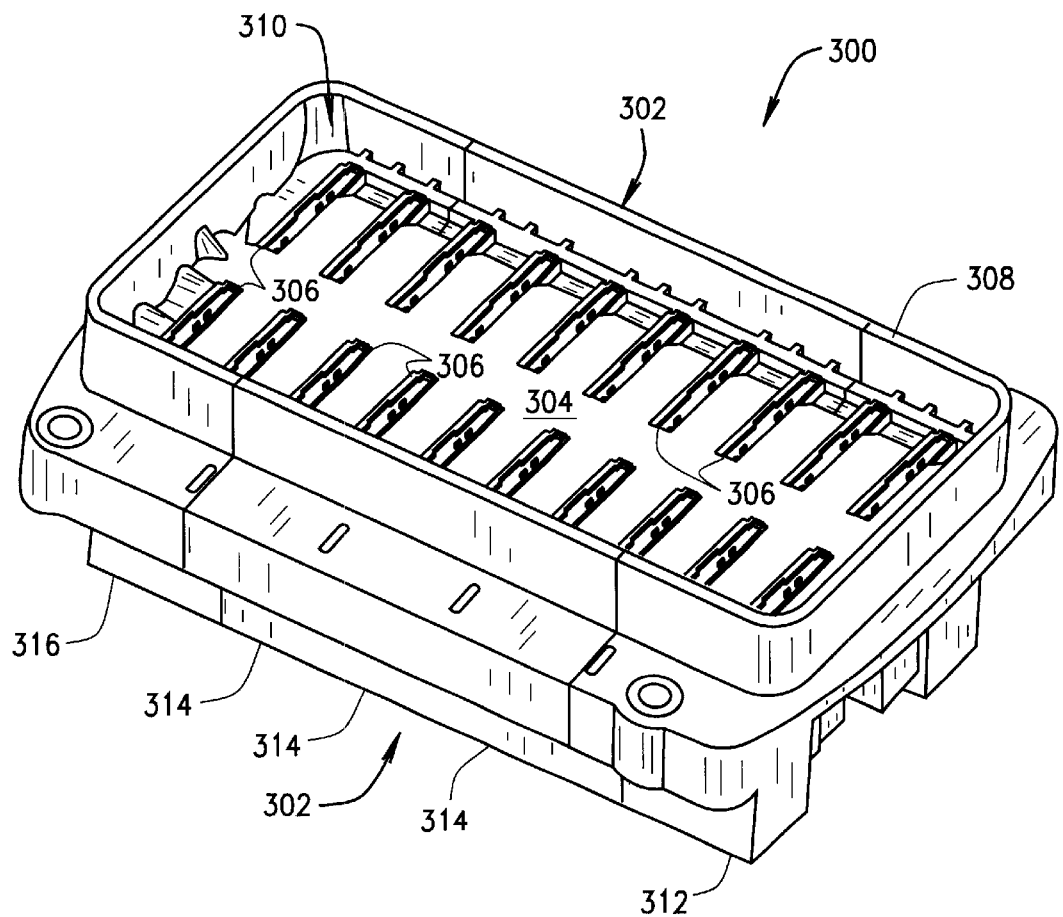
FIG. 12 is a top perspective view of another embodiment of a power distribution block.

FIG. 12 is a top perspective view of another embodiment of a power distribution block 300 including an insulative body 302 and an organizing tray 304 including indicia (not shown) such as numbers for making desired electrical connections with power distribution block 300. More specifically tray 304 at least partially defines a plurality of openings 306 which receive removable circuit elements, such as elements 177 shown and described above. Tray openings 306, in one embodiment, are numbered so as to correspond with the numbering of terminal blade slots (not shown in FIG. 12 but similar to slots 75 shown in FIG. 4) through facilitating identification of the circuits and circuit elements 177.

As desired, power distribution block 300 further includes a protective cover (not shown in FIG. 12), such as splash proof cover 10 illustrated and described above. An upstanding sidewall 308 extends around an upper perimeter of insulative body 302 for sealing engagement with the protective cover, and further to define an interior compartment 310 for making electrical connections.

Unlike the unitary one-piece monolithic insulative body 5 of power distribution block 1 (shown and described above), insulative body 302 of power distribution block 300 is modular and includes a first end section 312, three middle sections 314, and a second end section 316 engaged to one another to aggregately form internal compartment 310 that receives tray 304. As is evident from FIG. 12, power distribution block contains twenty openings 306 for electrical connections, or in other words a 20-pole distribution block is provided to accommodate a power input bus (not shown in FIG. 12) or combination of power input buses (not shown in FIG. 12) having twenty terminal blades, such as terminal blades 60 of bus bar 45 (shown and described above in relation to FIG. 3). Modular body sections 312, 314, 316 allow snap-together assembly of housing 302 to accommodate different bus bar members or additional bus bar members and therefore to provide a practically unlimited number of pole variations for a specific application. As will become evident below, each body section 312, 314, 316 includes two pairs of connection openings, or four openings apiece, and the total number of poles in power distribution block 300 may be varied by adding or subtracting middle sections 314 from the assembly.

Figure 13:
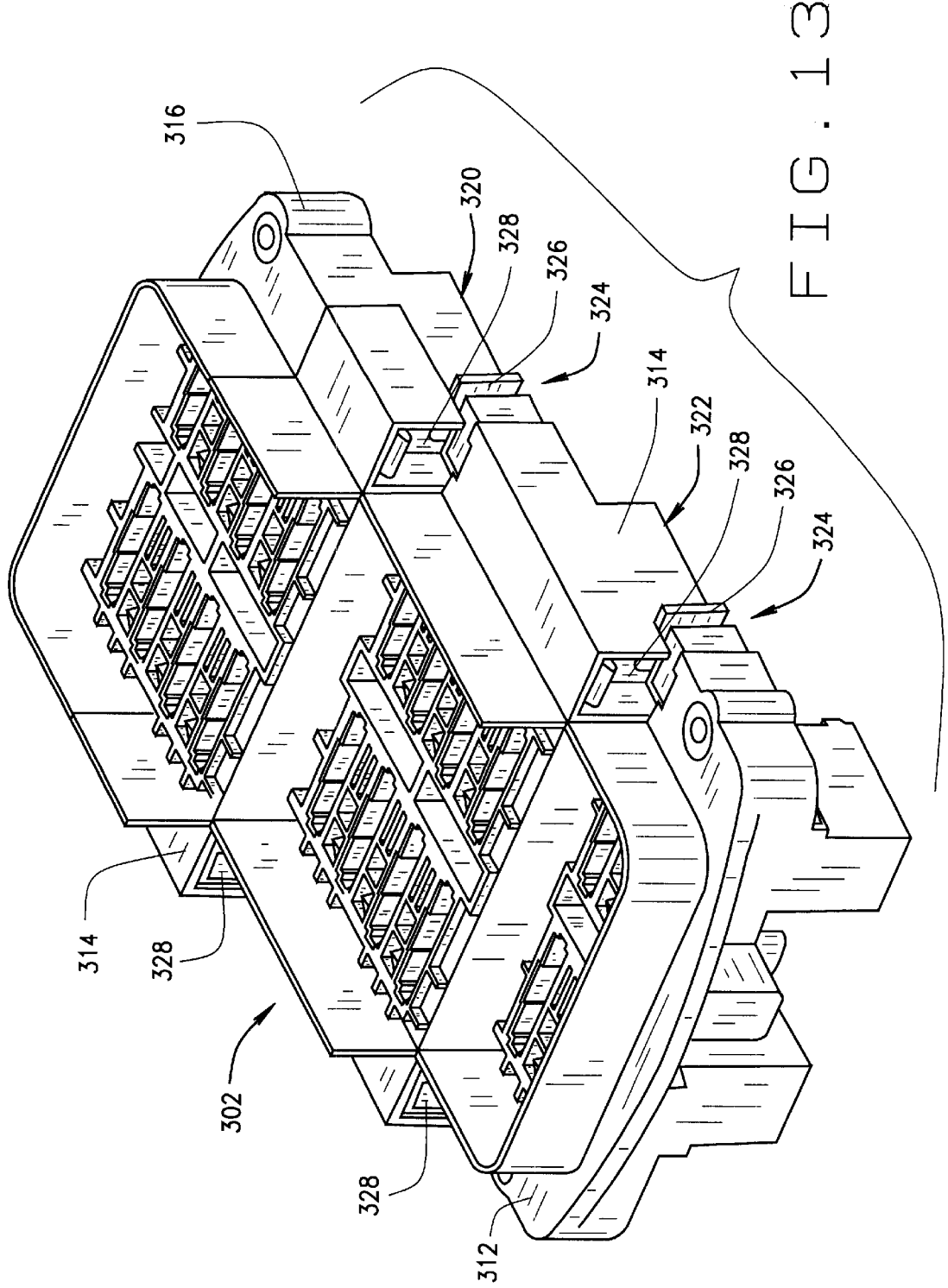
FIG. 13 is an exploded view of the power distribution block shown in FIG. 12.

FIG. 13 is an exploded view of modular power distribution block body 302 illustrating assembly of end section 312, middle sections 314 and end section 316. As depicted in FIG. 13, end section 316 is coupled to a middle section 314 to form a first subassembly 320, and two middle sections 314 are coupled to one another to form a second subassembly 322. As used herein, the term subassembly simply refers to a joining of two modular body sections. It is understood that body sections 312, 314, 316 could be assembled in any order to form a number of different combinations or subassemblies of modular body sections. The assemblies illustrated in FIG. 13 are therefore set forth for illustrative purposes only and are in no way intended to limit the invention to any particular combination of subassemblies in forming power distribution block body 302.

Referring again to FIG. 13, first subassembly 320 and second subassembly 322 are positioned for engagement to one another, and second subassembly 322 is positioned for engagement to end section 312. An overlapping tongue and groove arrangement 324 is employed to secure body sections 314 to end sections 312, 316, and subassemblies 322 and 324 to one another. A male tongue member 326 is provided on leading edges of respective body sections for engagement with a female groove or slot 328 of adjacent sections. Tongues 326 extend beneath leading edges of adjacent sections are received in complementary slots (not shown In FIG. 13) inside grooves 328 of mating sections so that the mating ends of adjacent sections slightly overlap one another and form a secure, structurally stable fit with one another. In one embodiment, sections 312, 314, 316 snugly fit together with a resistance fit that facilitates assembly and disassembly by hand and without employing tools.

Figure 14:
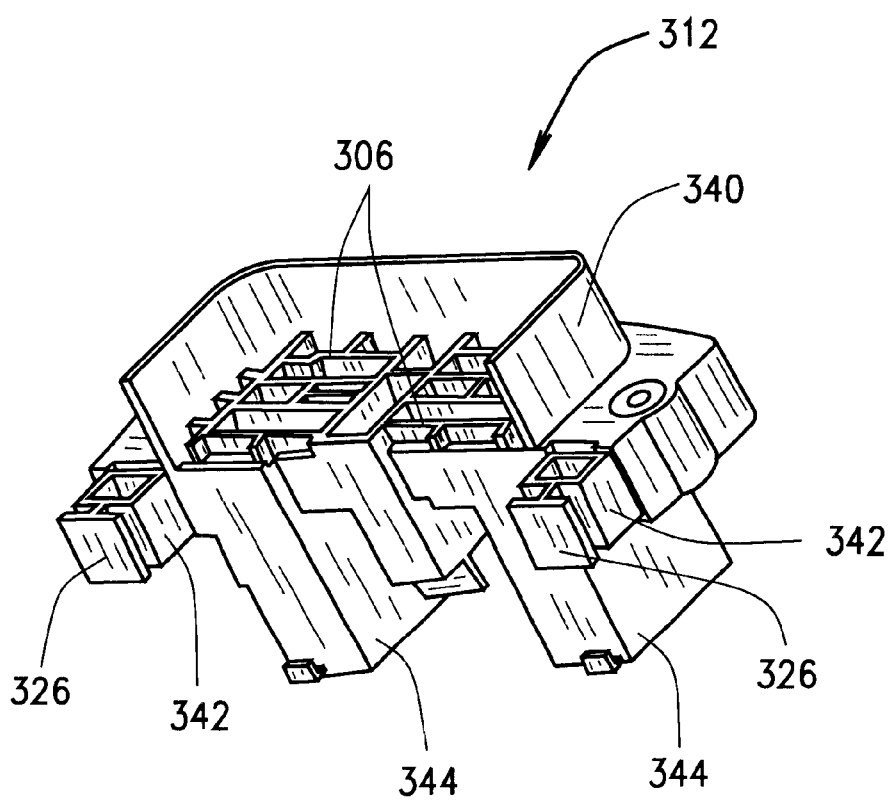
FIG. 14 is an perspective view of a first end portion of the power distribution block shown in FIGS. 11 and 12.
Figure 15:
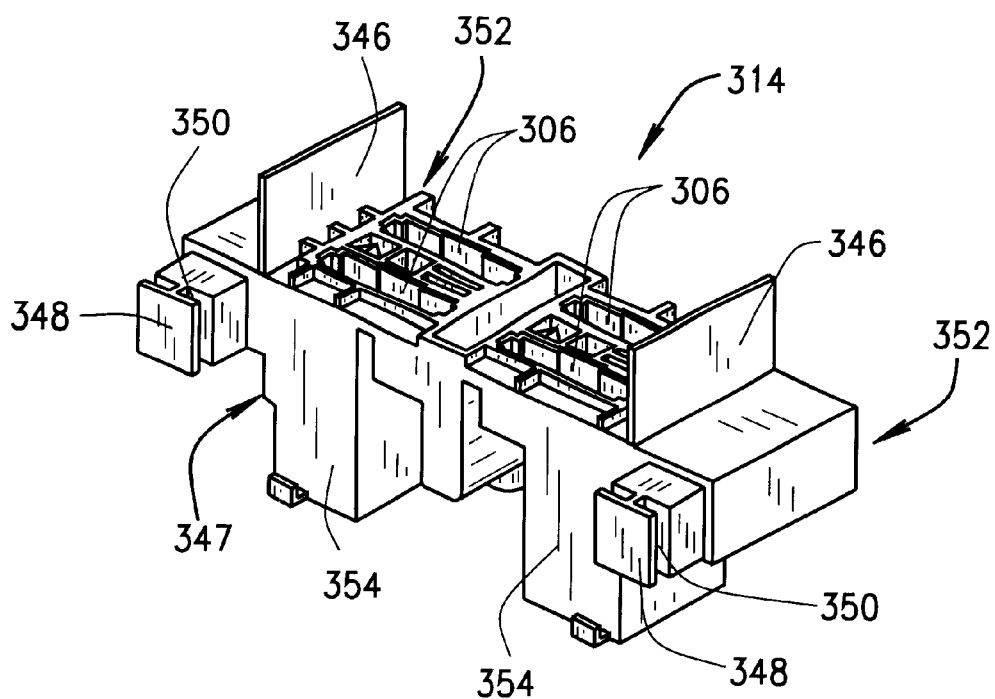
FIG. 15 is an perspective view of a middle portion of the power distribution block shown in FIGS. 11 and 12.
Figure 16:
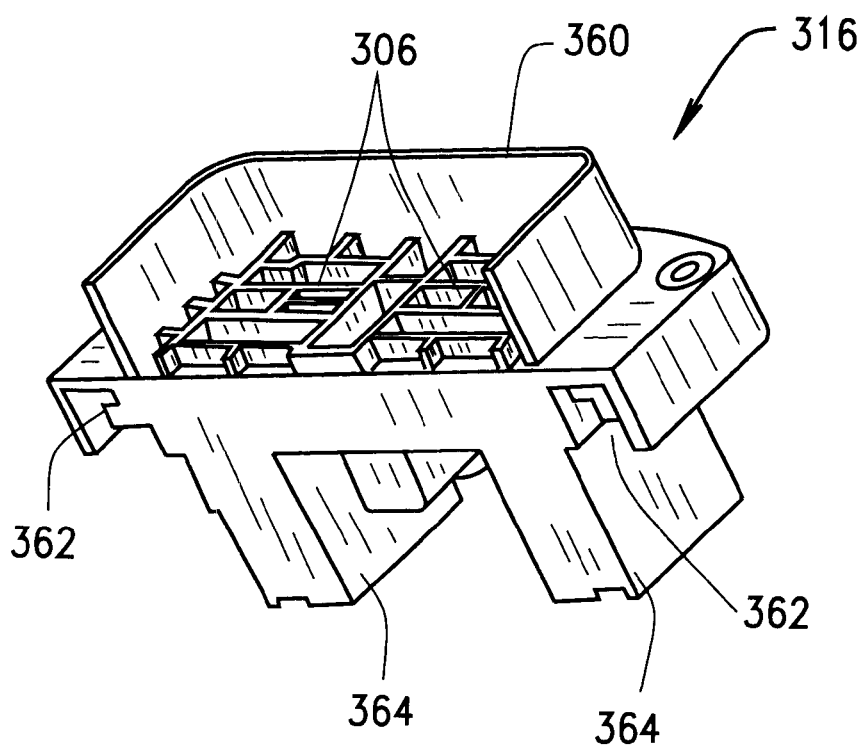
FIG. 16 is an perspective view of a second end portion of the power distribution block shown in FIGS. 11 and 12.

FIGS. 14–16 illustrate individual modular body sections 312, 314, 316, respectively. Referring to FIG. 14, end section 312 includes four electrical connection openings 306, a wrap-around upstanding wall portion 340 forming an end portion of compartment 320 (shown in FIG. 12), and tongues 326 extending from leg extensions 342 for coupling to a modular body middle section 314. Parallel legs 344 depend below wall portion 340 to define a plurality of open chambers (not shown in FIG. 14 but similar to chambers 100 shown and described above in relation to FIG. 4) which permit the passage of electrical connector elements, such as those described above.

While end section 312 is illustrated with four electrical connection openings 306, it is contemplated that end sections 312 having greater or fewer than four electrical connection openings may be employed without departing from the scope of the present invention.

Referring to FIG. 15, middle section 314 includes four electrical connection openings 306, parallel upstanding wall portions 346 further defining compartment 320 (shown in FIG. 12) when middle section 314 is coupled to an end section 312 or 316. A first engagement side 347 of middle section 314 includes a pair of coupling tongues 348 extending from leg extensions 350 for coupling to another modular body middle section 314, or to an end section 316, further described below. A second engagement side 352 includes grooves or slots 328 (shown in FIG. 13) extending opposite tongues 348 for connection to another middle section 314 or to an end section 312 (shown in FIG. 14). Parallel legs 354 depend below wall portions 346 to define a plurality of open chambers (not shown in FIG. 15 but similar to chambers 100 shown and described above in relation to FIG. 4) which permit the passage of electrical connector elements, such as those described above.

While middle section 314 is illustrated with four electrical connection openings 306, it is contemplated that middle sections 314 having greater or fewer than four electrical connection openings may be employed without departing from the scope of the present invention. In addition, when more than one middle section is employed for a given application, such as body 302 illustrated in FIGS. 12 and 13, middle sections 314 need not have the same number of openings. Thus, for example, a middle section having four electrical connection openings 306 may be employed with a middle section having six electrical connection openings 406. Thus, larger and smaller middle sections relative to one another may be separately employed or utilized in combination with one another to effectively meet the needs of specified applications.

Referring to FIG. 16, end section 316 includes four electrical connection openings 306, a wrap-around upstanding wall portion 360 forming an end portion of compartment 320 (shown in FIG. 12), and groove 362 for accepting tongues 354 of middle section 314 (shown in FIG. 15) or for accepting tongues 326 of another end section 312. Parallel legs 364 depend below wall portion 360 to define a plurality of open chambers (not shown in FIG. 14 but similar to chambers 100 shown and described above in relation to FIG. 4) which permit the passage of electrical connector elements, such as those described above.

While end section 316 is illustrated with four electrical connection openings 306, it is contemplated that end sections 316 having greater or fewer than four electrical connection openings may be employed without departing from the scope of the present invention.

It should now be evident that modular body sections 312, 314, 316 may be connected to one another by coupling respective male and female ends of the sections 312, 314, 316. Assembling sections 312, 314, 316 to one another, as shown in FIG. 13 therefore results in a rigid body 302 (shown in FIG. 12) having a selected number of electrical connections openings 306 and an associated number of open chambers depending from an opposite side of body 302 for passage of connector elements. Once modular body 302 is assembled in this fashion, power distribution block assembly 300 (shown in FIG. 12) is operable substantially as described above in relation to power distribution block 1 set forth above.

Figure 17:
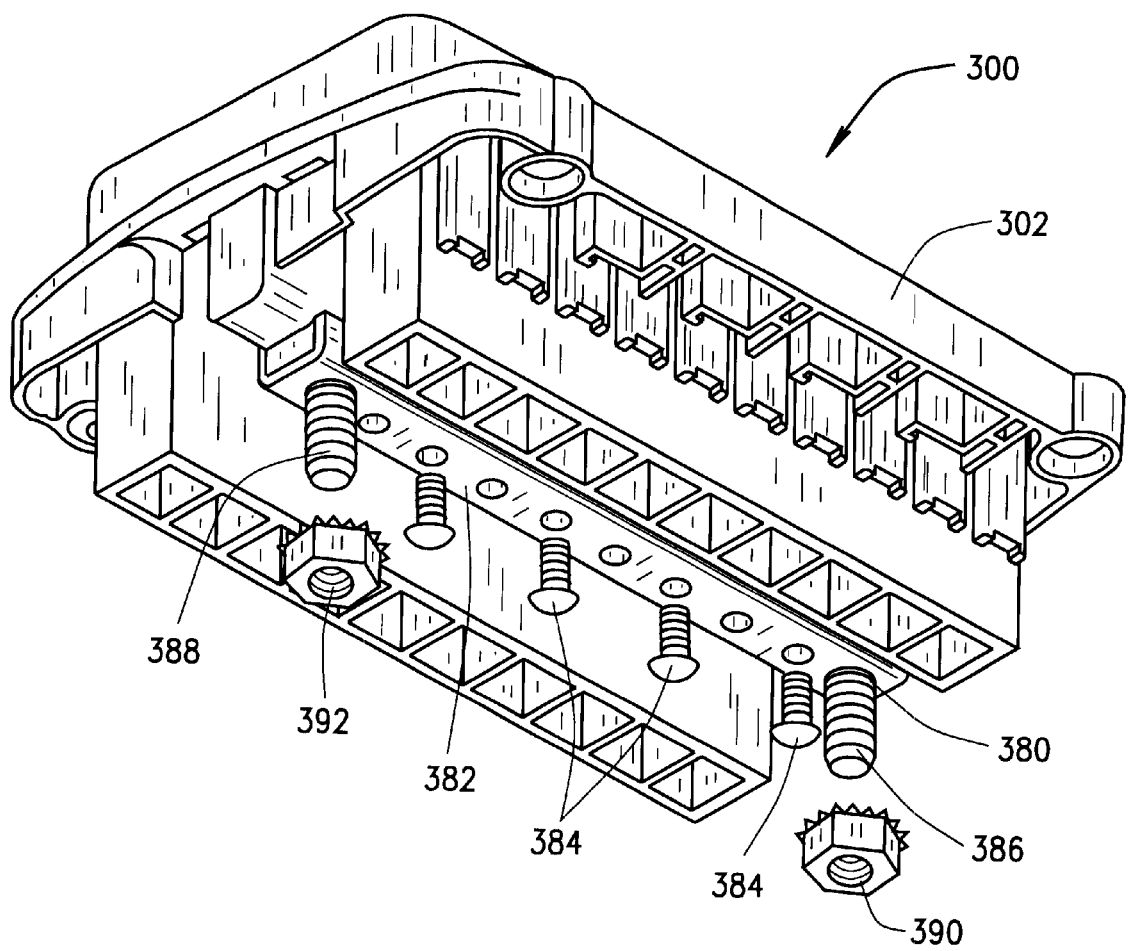
FIG. 17 is a bottom perspective view of the power distribution block shown in FIGS. 11 and 12.

FIG. 17 is a bottom perspective view of power distribution block 300 including an assembled modular body 302 and first and second input bus bars 380, 382 coupled to an underside of modular housing 302 with threaded fasteners 384, and further including respective stud terminals 386, 388 for power input connections via nuts 390, 392. It is appreciated that other connection schemes and fasteners could be employed in lieu of terminal studs 386, 388 in alternative embodiments without departing from the scope of the present invention.

As noted above, first and second bus bars 380, 382 facilitate providing power to certain circuit elements from a power source (e.g., a battery) at all times, and to provide power to other circuit elements only at certain times, such as for vehicle ignition systems.

In the illustrated embodiment, bus member 380 is similar to bus bar member 45 (shown and described above in relation to FIG. 3) but includes six terminal blades 60, while bus member 382 is similar to bus bar member 45 (shown and described above in relation to FIG. 3) but includes fourteen terminal blades 60. Thus a total of twenty terminal blades are provided to 20-pole operation of power distribution block 300 through twenty access openings 306 (shown in FIG. 12) in an opposite side of modular body 302. It is recognized, however, that the modular nature of body 302 facilitates a wide range of bus member options to accommodate a particular application.

For example, an additional middle section 314 could be employed to accommodate for instance, a first bus bar having sixteen terminal blades and a second bus bar having eight terminal blades for 24-pole operation of the power distribution block. As another example, one of middle sections 314 could be subtracted from power distribution block 300 to form a 16-pole distribution block having, for instance, two input bus bars having eight terminal blades apiece. In yet another example, two additional middle sections 314 could be added to power distribution block 300 to accommodate a third power input bus bar having eight terminal blades, in addition to bus bars 380, 382. Finally, the modular construction of body 102 could be equally employed with a variety of single power bus input bars. While only a few examples are set forth, it should now be realized that modular body 302 permits a practically unlimited number of pole combinations for different applications in a simple, compact, easily assembled, and low cost package.

While the invention has been described in terms of various specific embodiments, those skilled in the art will recognize that the invention can be practiced with modification within the spirit and scope of the claims.

What is claimed is:

1. A power distribution block assembly comprising:
   an insulative body comprising at least a first modular body section and a second modular body section, each of said first modular body section and said second modular body section comprising a number of electrical connection openings;
   at least one electrically conductive bus member having a longitudinally-extending base and a plurality of terminal blades extending from said base, said base having a site for electrical connection to a power source and comprising a longitudinally elongated U-shape channel defined by opposite legs, said plurality of terminal blades extending from said legs, said terminal blades including a plurality of sites for electrical connection to a plurality of removable circuit elements; and
   a plurality of separate connector elements contained within said body, each of said connector elements being configured to engage a terminal blade of said bus with a terminal of a respective one of said removable circuit elements.

2. A power distribution block assembly in accordance with claim 1, said insulative body comprising at least a first end section, a second end section, and a middle section engaged to said first end section and to said second end section.

3. A power distribution block assembly in accordance with claim 1 wherein said first modular body section and said second modular body section are configured for snap-fit engagement to one another.

4. A power distribution block assembly in accordance with claim 1 wherein each of said first and second modular body sections comprise a plurality of electrical access openings providing access to said sites of said terminal blades.

5. A power distribution block assembly in accordance with claim 4 wherein said first modular body section comprises a male coupling and said second modular body section comprises a female coupling, said male and said female coupling configured for connection to one another to form said body.

6. A power distribution block assembly in accordance with claim 4 wherein said first modular body and said second modular body are configured for connection to one another with a tongue and groove arrangement.

7. A power distribution block assembly comprising:
   an insulative body comprised of a plurality of modular sections connected to one another;
   a plurality of electrically conductive bus members, each having a longitudinally extending base and a plurality of terminal blades extending from said base, each said base defining a site for electrical connection to a power source, said terminal blades defining a plurality of sites for electrical connection to a plurality of removable circuit elements;
   a plurality of separate connector elements contained within each of said sections of said body, each of said connector elements being configured to engage a terminal blade of said bus with a terminal of a respective one of said removable circuit elements.

8. A power distribution block assembly in accordance with claim 7 wherein said modular sections comprises at least a first end section, at least one middle section, and at least a second end section.

9. A power distribution block assembly in accordance with claim 8 wherein said middle section comprises a male end and a female end for connection to another of said plurality of modular sections.

10. A power distribution block assembly in accordance with claim 9 wherein said male end of said middle section overlaps a female end of another of said plurality of modular sections.

11. A power distribution block assembly in accordance with claim 8 further comprising at least two middle sections.

12. A power distribution block assembly in accordance with claim 7 wherein each of said modular sections comprises a plurality of electrical connector openings, said plurality of openings of each said section being less in number than said plurality of sites of said terminal blades.

13. A modular body for a power distribution block assembly including: at least one electrically conductive bus member having a longitudinally-extending base and a plurality of terminal blades extending from said base, the base having a site for electrical connection to a power source and having a longitudinally elongated U-shape channel defined by opposite legs, a plurality of terminal blades extending from the legs, and the terminal blades including a plurality of sites for electrical connection to a plurality of removable circuit elements, said body comprising:
   a first body section fabricated from an insulative material and comprising a first number of electrical connection openings therein for connection to the sites of the terminal blades;

a second body section fabricated from an insulative material and comprising a second number of said electrical connections opening therein for connection to the sites of the terminal blades; each of said first and second body sections configured for snap-fit engagement to one another to accommodate the plurality of sites of the terminal blades of the bus member.

14. A modular body in accordance with claim 13 wherein each of said first and second body sections includes first and second legs for containing a plurality of separate connector elements, each of said connector elements being configured to engage a terminal blade of the bus with a terminal of a respective one of the removable circuit elements.

15. A modular body in accordance with claim 13 wherein said body comprises a at least a first end section, at least one middle section and at least a second end section.

16. A modular body in accordance with claim 15 wherein said first end section comprises a male end, said second end section comprises a female end, and said middle section comprises a male end a female end, said male and female ends of said respective sections configured for snap-fit engagement to one another.

17. A modular body in accordance with claim 16 wherein said male ends comprise a tongue and said female ends comprise a groove.

18. A modular body in accordance with claim 17 wherein said male and female ends overlap one another.

19. A modular body in accordance with claim 13 wherein said first number of openings of said body section is equal to said second number of openings of said second body section.

20. A modular body in accordance with claim 13 further comprising an organizing tray disposed about said first number of electrical connection openings of said first body section and said second number of electrical connection openings of said second body section.

* * * * *